United States Patent [19]
Kawagishi et al.

[11] Patent Number: 5,798,507
[45] Date of Patent: Aug. 25, 1998

[54] IC CARD READER/WRITER

[75] Inventors: Toshiyuki Kawagishi, Tokyo; Youko Kondou, Yokohama, both of Japan

[73] Assignee: Kabushiki Kaisha Toshiba, Kawasaki, Japan

[21] Appl. No.: 603,207

[22] Filed: Feb. 20, 1996

[30] Foreign Application Priority Data

Feb. 20, 1995 [JP] Japan .................................. 7-030712

[51] Int. Cl.$^6$ ...................................................... G06K 5/00
[52] U.S. Cl. ...................................................... 235/380
[58] Field of Search .............................. 235/380, 375, 235/492

[56] References Cited

U.S. PATENT DOCUMENTS 5,581,708 12/1996 Iijima .................................. 235/380

FOREIGN PATENT DOCUMENTS 0 193 635  9/1986  European Pat. Off. .
0 513 507  11/1992  European Pat. Off. .
0 680 002  11/1995  European Pat. Off. .

*Primary Examiner*—F. L. Evans
*Attorney, Agent, or Firm*—Cushman Darby & Cushman IP Group of Pillsbury Madison & Sutro LLP

[57] ABSTRACT

A protocol is previously set by a command transmitted from a host device to a reader/writer. When an operation clock supplied from the reader/writer is changed for an IC card to which a plurality of operation clocks can be applied, the host device determines the operation clock based on initial information transmitted from the IC card inserted into the reader/writer, and if it is determined that the operation clock must be changed, it changes the operation clock. If the IC card has a plurality of operation modes, the reader/writer supplies a reset signal to the IC card twice when the reader/writer selects the operation mode of the IC card, and the contents of initial information items obtained at this time are determined t be different form each other after they are compared, the reader/ writer is set into one of the operation modes.

13 Claims, 8 Drawing Sheets

IC CARD READER/WRITER

BACKGROUND OF THE INVENTION

1. Field of the Invention

This invention relates to an IC card reader/writer for reading out and writing information from or into IC cards having different protocols.

2. Description of the Related Art

For example, an IC card reader/writer incorporated into a cash processing device used in a financial organ or the like reads out various information stored in an IC card inserted therein by the user and supplies the readout information to the main body of a cash processing device which is connected as a host device to the reader/writer, and then the information is subjected to various processes. Further, the IC card reader/writer writes information from the main body of the device into the IC card.

As the protocol permitting communication between the IC card and the IC card reader/writer, a "T=14" protocol is now mainly used in Japan and IC cards intended for the "T=14" protocol are dominant, and therefore, most of the IC card readers/writers are designed to deal with IC cards used for "T=14" protocol.

On the other hand, in the world, the protocol of IC cards is standardized to a "T=1" or "T=0" protocol, and the protocol seems to become dominant in future in Japan. However, it is impossible to think that the "T=14" protocol is immediately changed to the "T=1" or "T=0" protocol, and in the transition period, IC cards of different types of protocols will be used. Therefore, if an IC card reader/writer is not designed to cope with the different types of protocols, IC card readers/writers respectively designed for the different types of protocols become necessary and this is inconvenient.

SUMMARY OF THE INVENTION

An object of this invention is to provide an IC card reader/writer capable of coping with IC cards of different types of protocols, coping with the function inherent to each protocol and significantly increasing the convenience thereof.

In order to achieve the above object, according to one aspect of the present invention, there is provided an IC card reader/writer comprising receiving means for receiving a command containing protocol information corresponding to one of a plurality of protocols from a host device; analyzing means for analyzing the command received by the receiving means; setting means for setting a protocol for communication with an IC card according to the protocol information contained in the command analyzed by the analyzing means; and communication means for communicating with the IC card based on the protocol set by the setting means.

According to another aspect of the present invention, there is provided an IC card reader comprising activating means for activating an IC card by use of a clock with a preset rate; receiving means for receiving initial information from the IC card; determining means for analyzing the initial information received by the receiving means and determining a protocol for the IC card; and setting means for setting the protocol determined by the determining means as a protocol for communication with the IC card.

Further, according to another aspect of the present invention, there is provided an IC card reader for communication with an IC card capable of coping with a plurality of operation clock rates, comprising activating means for activating an IC card by use of a clock with a preset rate; receiving means for receiving initial information from the IC card; determining means for analyzing the initial information received by the receiving means and determining a plurality of operation clock rates of the IC card; selecting means for selecting the highest clock rate among the plurality of operation clock rates determined by the determining means; and means for changing the clock rate used for communicating with the IC card to the highest clock rate selected by the selecting means.

Further, according to another aspect of the present invention, there is provided an IC card reader for communication with an IC card capable of coping with a plurality of operation modes, comprising activating means for activating an IC card by use of a clock with a preset rate; first receiving means for receiving first initial information from the IC card; first storing means for storing the first initial information received by the first receiving means; means for supplying a reset signal to the IC card; second receiving means for receiving second initial information transmitted from the IC card in response to the reset signal; second storing means for storing the second initial information received by the second receiving means; determining means for comparing the first and second initial information items stored in the first and second storing means and determining that the IC card is an IC card having a plurality of operation modes; selecting means for selecting one of the plurality of operation modes when the determining means has determined that the IC card is an IC card having a plurality of operation modes; and communication means for communicating with the IC card in the operation mode selected by the selecting means.

By previously setting a corresponding protocol according to a command transmitted from the host device to the IC card reader/writer, the IC card reader/writer can deal with an IC card having a plurality of different protocols.

Further, in a case where the operation clock supplied from the IC card reader/writer is changed for an IC card to which a plurality of operation clocks can be applied, the operation clock is changed if the operation clock is determined in the host device based on initial information transmitted from an IC card after the IC card inserted into the IC card reader/writer is activated and when it is determined that the operation clock must be changed. Therefore, it is possible to easily and stably cope with an IC card having a plurality of operation clocks.

If the IC card has a plurality of operation modes, a reset signal is supplied twice to the IC card from the IC card reader/writer when the operation mode of the IC card is selected by the IC card reader/writer. The content of initial information supplied from the IC card at the time of first supply of the reset signal is compared with the content of initial information supplied from the IC card at the time of next supply of the reset signal, and if the contents are different from each other, it is determined that the IC card is an IC card operated in a plurality of operation modes. The IC card reader/writer can easily and stably deal with an IC card having a plurality of operation modes by setting one of the operation modes.

Further, after the IC card inserted into the IC card reader/writer is activated and initial information is transmitted, an IC card node address previously designated by the host device is transmitted to the IC card together with a command and set therein. Thus, it becomes possible to easily and stably set a desired node address for the IC card.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

DETAILED DESCRIPTION OF THE PREFERRED EMBODIMENTS

There will now be described embodiments of this invention with reference to the accompanying drawings.

Figure 1:
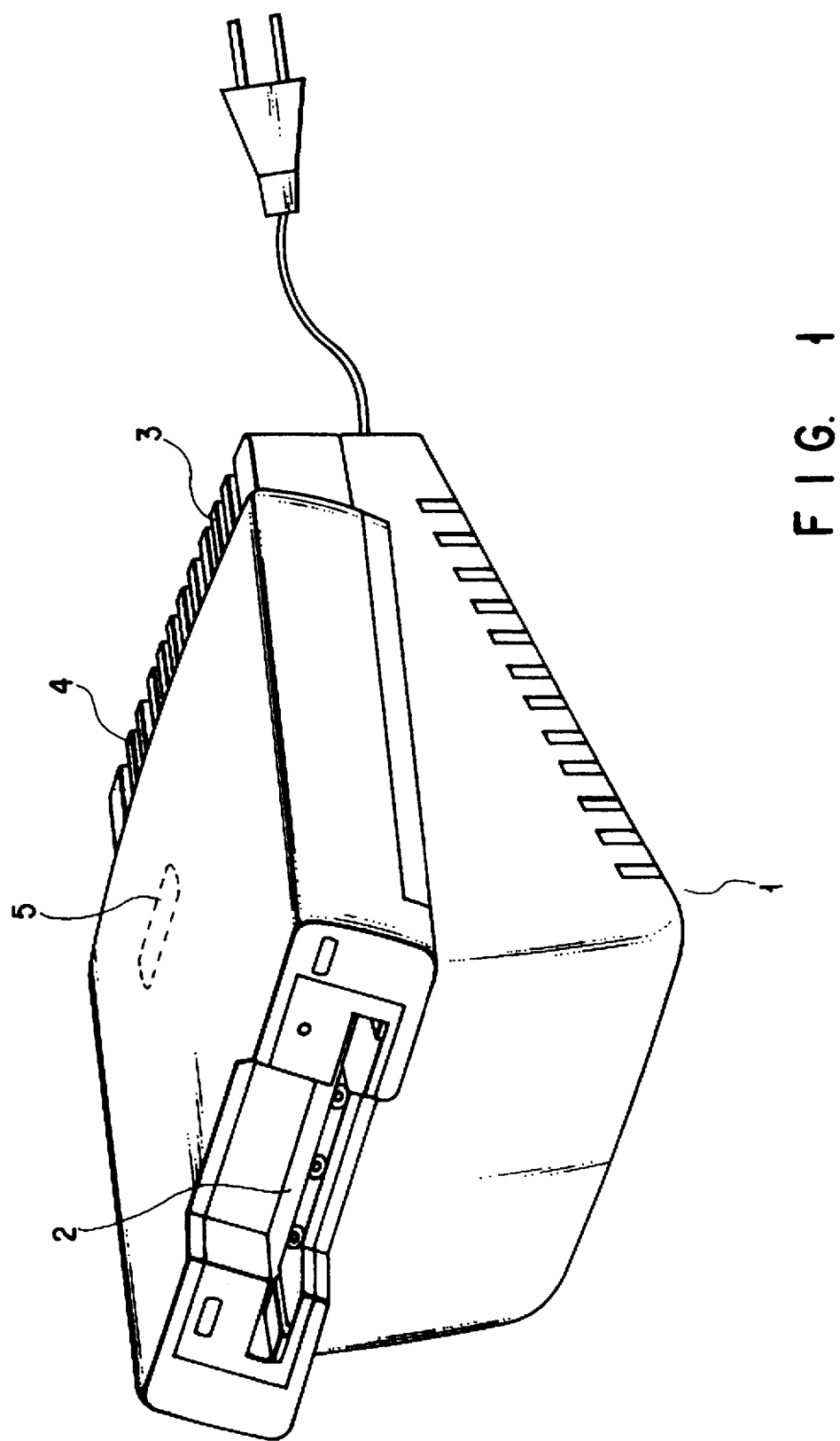
FIG. 1 is an external view of an IC card reader/writer according to one embodiment of this invention.

FIG. 1 shows an appearance of an IC card reader/writer according to one embodiment of this invention.

As shown in FIG. 1, an insertion slot 2 through which an IC card is inserted is formed in the front portion of an IC card reader/writer (which is hereinafter simply referred to as a reader/writer) 1 and a communication port (contact) for communication with the IC card insert ed into the insertion slot is formed in the internal portion of the reader/writer 1 (refer to FIG. 2). Further, a communication port 3 constructed by a preset connector is provided on the rear surface side and the communication port 3 is connected to a host device (main body of the device) such as a cash register to permit communication with the host device. Further, a communication port 4 constructed by a preset connector for connection with a keypad used as an option is provided.

Figure 2:
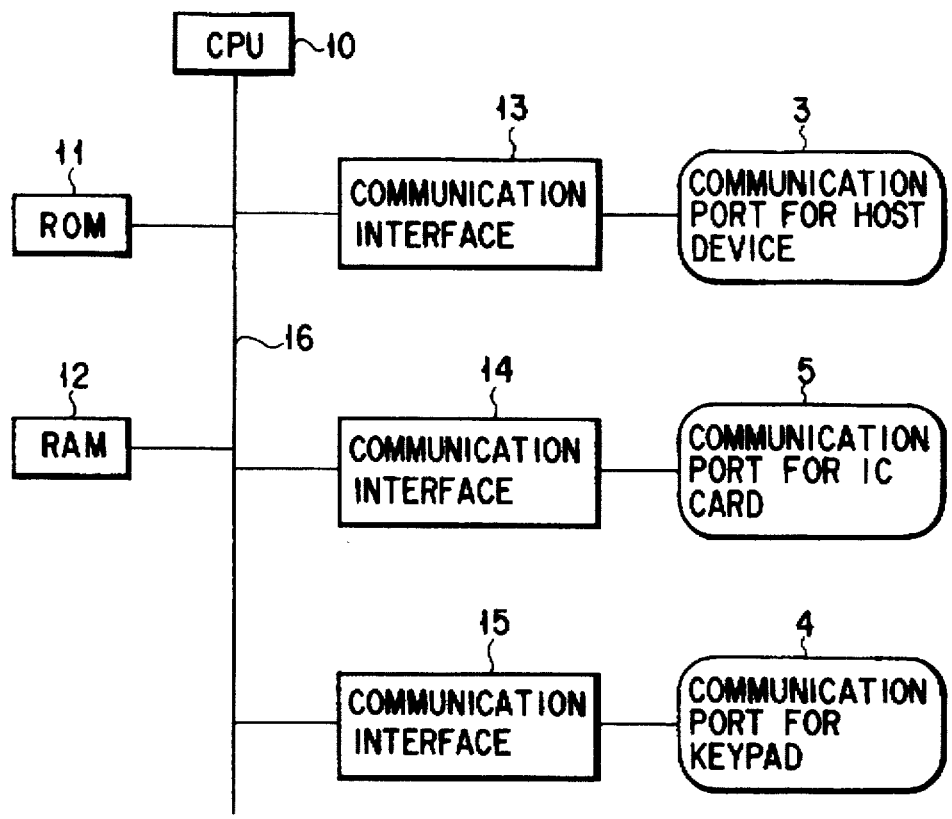
FIG. 2 is a block diagram schematically showing the construction of the IC card reader/writer of FIG. 1.

FIG. 2 schematically shows the construction of the reader/writer 1. As shown in FIG. 2, a CPU 10 for controlling the whole portion of the reader/writer 1 is connected to a ROM 11, RAM 12, and communication interfaces 13 to 15 via a bus 16.

In the ROM 11, an operation control program of the reader/writer 1 of this invention and the like are stored, and the CPU 10 is operated according to the program. Various data items necessary for control by the CPU 10 are temporarily stored in the RAM 12.

The communication interface 13 acts as an interface for permitting communication with the host device via the communication port 3, subjects data from the host device to a preset converting process and then supplies the data to the CPU 10, and subjects data from the CPU 10 to a preset converting process and then supplies the data to the host device via the communication port 3. The communication interface 14 acts as an interface for permitting communication with the IC card via the communication port 5, subjects data from the IC card to a preset converting process and then supplies the data to the CPU 10, and subjects data from the CPU 10 to a preset converting process and then supplies the data to the IC card via the communication port 5. The communication interface 15 acts as an interface for permitting communication with the keypad via the communication port 4, and subjects data from the keypad to a preset converting process and then supplies the data to the CPU 10.

Figure 3:
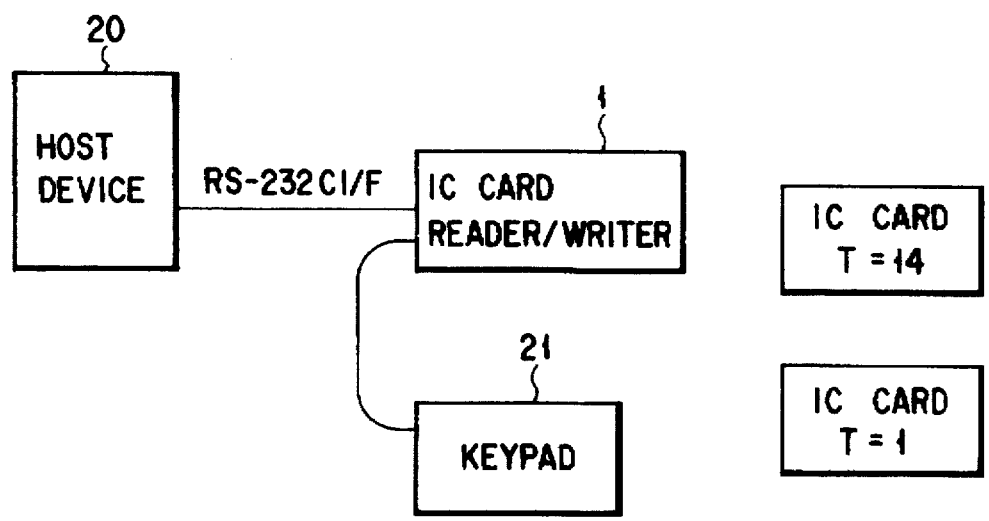
FIG. 3 is a diagram showing one example of the application mode of the IC card reader/writer in a case where a host device is connected to the IC card reader/writer of FIG. 1.

FIG. 3 shows one example of the application mode of the reader/writer 1 in a case where the host device is connected to the reader/writer 1. As shown in FIG. 3, for example, a host device 20 is connected to the communication port 3 of the reader/writer 1 via an RS232C interface cable. Further, a keypad 21 is connected to the communication port 4 if necessary. The keypad is used by the user to input a pass word or the like at the time of usage of the reader/writer.

In the following explanation, for simplicity, the reader/writer 1 is explained as a device designed to cope with the "T=14" protocol (block transfer protocol for use in Japan) and "T=1" protocol (block transfer protocol). The protocols which can be applied are not limited to the above two protocols. In the "T=14" protocol and "T=1" protocol, for example, the ways of re-transmission requests and commands used and the clock rates are different. The typical clock rates of the above protocols are 4.9 MHz in the "T=14" protocol and 3.5 MHz in the "T=1" protocol.

The first embodiment is explained with reference to FIG. 4. The first embodiment has a feature that the reader/writer 1 selects a corresponding protocol according to data (command) supplied from the host device 20 in the application mode shown in FIG. 3.

Figure 4:
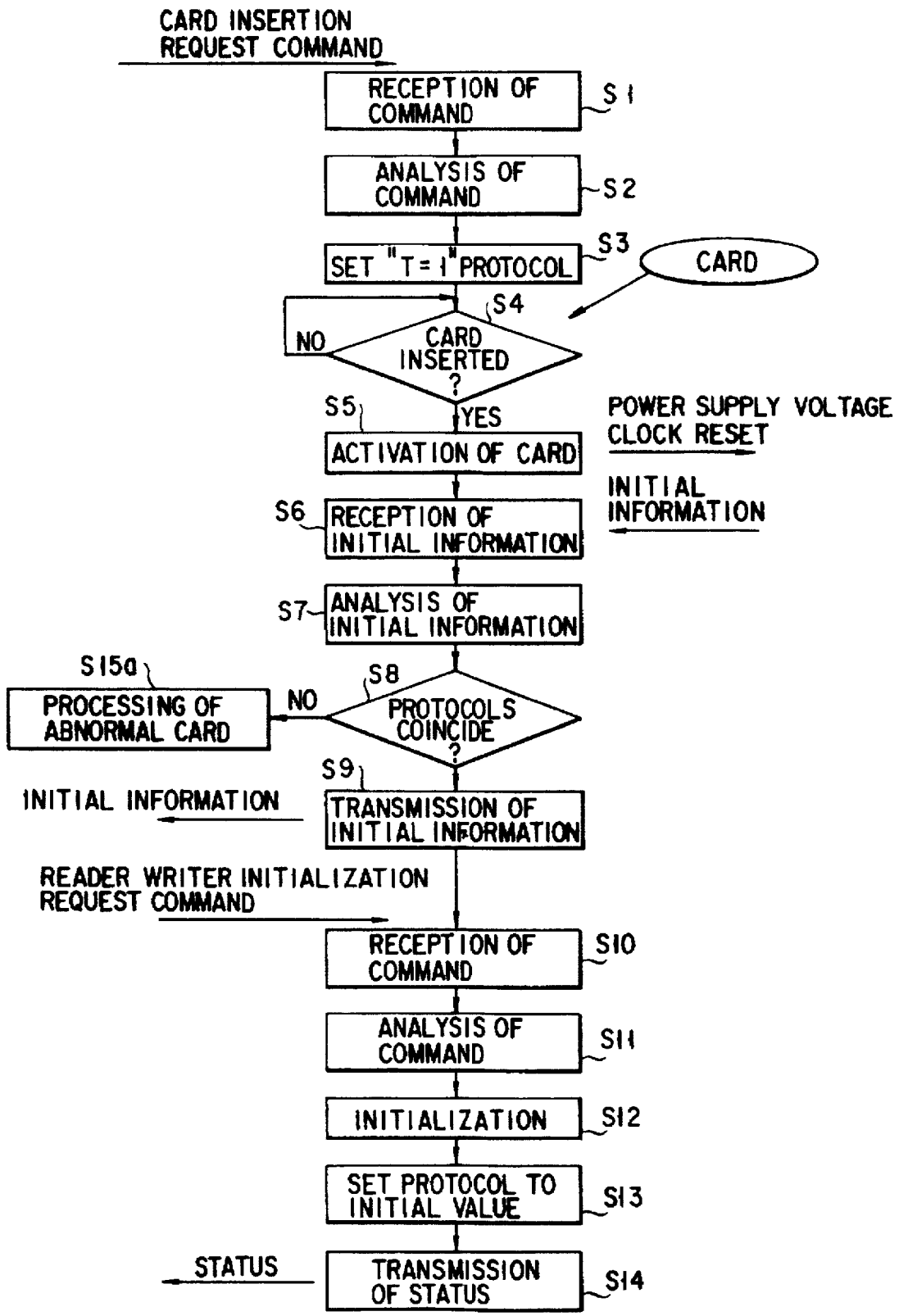
FIG. 4 is a flowchart for illustrating the whole operation in the application mode of FIG. 3 according to the first embodiment.

FIG. 4 is a flowchart for illustrating the whole operation process. First, in the step S1, a card insertion request command is transmitted from the host device 20 to the reader/writer 1. The content of the card insertion request command contains various data items for requesting the insertion of the IC card and data for setting each protocol (T=1 or T=14). The reader/writer 1 determines the protocol by analyzing the command and is set into the waiting state for insertion of the IC card (step S2). In this example, it is supposed that the "T=1" protocol is set as the result of analysis of the command (step S3a).

Next, if insertion of an IC card into the insertion slot 2 is detected by a sensor disposed in the card insertion slot 2 of the reader/writer 1 (step S4), a power supply voltage and clock are supplied from the communication interface 14 to the IC card via the communication port 5 and resetting of the IC card (activation of the card) is effected (step S5). At this time, the clock to be supplied is different depending on the protocol, and as described above, a clock of 3.5 MHz is supplied in the case of "T=1" protocol and a clock of 4.9 MHz is supplied in the case of "T=14" protocol. In this example, the "T=1" protocol is set and a clock of 3.5 MHz is supplied.

When an IC card corresponding to the "T=1" protocol is supplied with a clock of 3.5 MHz, it transmits initial information to the reader/writer 1 (step S6). In the case of IC card corresponding to the "T=14" protocol, the IC card transmits initial information to the reader/writer 1 when it is supplied with a clock of 4.9 MHz.

The reader/writer 1 which has received the initial information from the IC card analyzes the content of the initial information. For example, the reader/writer 1 checks whether the IC card coincides with the protocol ("T=1" protocol, in this example) set in the step S3a based on data contained in the initial information which can be used to determine the protocol of the IC card (step S8). When an IC card of a protocol different from the protocol set in the reader/writer 1 is inserted, the protocol is checked in the step S8, and then the IC card is treated, e.g. ejected, as an abnormal card (step S15). In this case, if the host device 20 transmits data corresponding to another protocol, that is, "T=14" protocol to the reader/writer 1 as in the case of the step S1, the reader/writer 1 can set the protocol which permits communication with the IC card to the "T=14" protocol. On the other hand, if coincidence of the protocols is determined based on the initial information from the IC card in the step S8, the initial information is transmitted to the host device 20 via the communication interface 13 and communication port 3 (step S9).

The reader/writer 1 keeps the communication protocol unchanged until a reader/writer initialization request command is received from the host device 20. The content of the reader/writer initialization request command contains various data for initializing the reader/writer. Therefore, in a period after the protocol is set until the reader/writer is initialized by the reader/writer initialization request command, the reader/writer treats a command for a different protocol as an abnormal command even if the command is received from the host device 20.

Next, the protocol changing operation is explained. When the reader/writer initialization request command is received from the host device 20 (step S10), the reader/writer 1 analyzes the command (step S11) and initializes the reader/write 1 (step S12). That is, the communication protocol of the reader/writer 1 is also initialized (step S13). In this case, for example, the "T=1" protocol is used as the initially set protocol. After the reader/writer 1 has completed the initialization, status information obtained as the result of initialization is transmitted to the host device 20 (step S14).

Thus, according to the first embodiment, since a corresponding protocol is previously set according to a command supplied from the host device 20 to the reader/writer 1, the reader/writer 1 can cope with IC cards having different protocols.

Next, the second embodiment is explained with reference to FIG. 5. The second embodiment has a feature that a reader/writer 1 selects a protocol used for communication with an IC card according to initial information received from the IC card in the application mode shown in FIG. 3.

Figure 5:
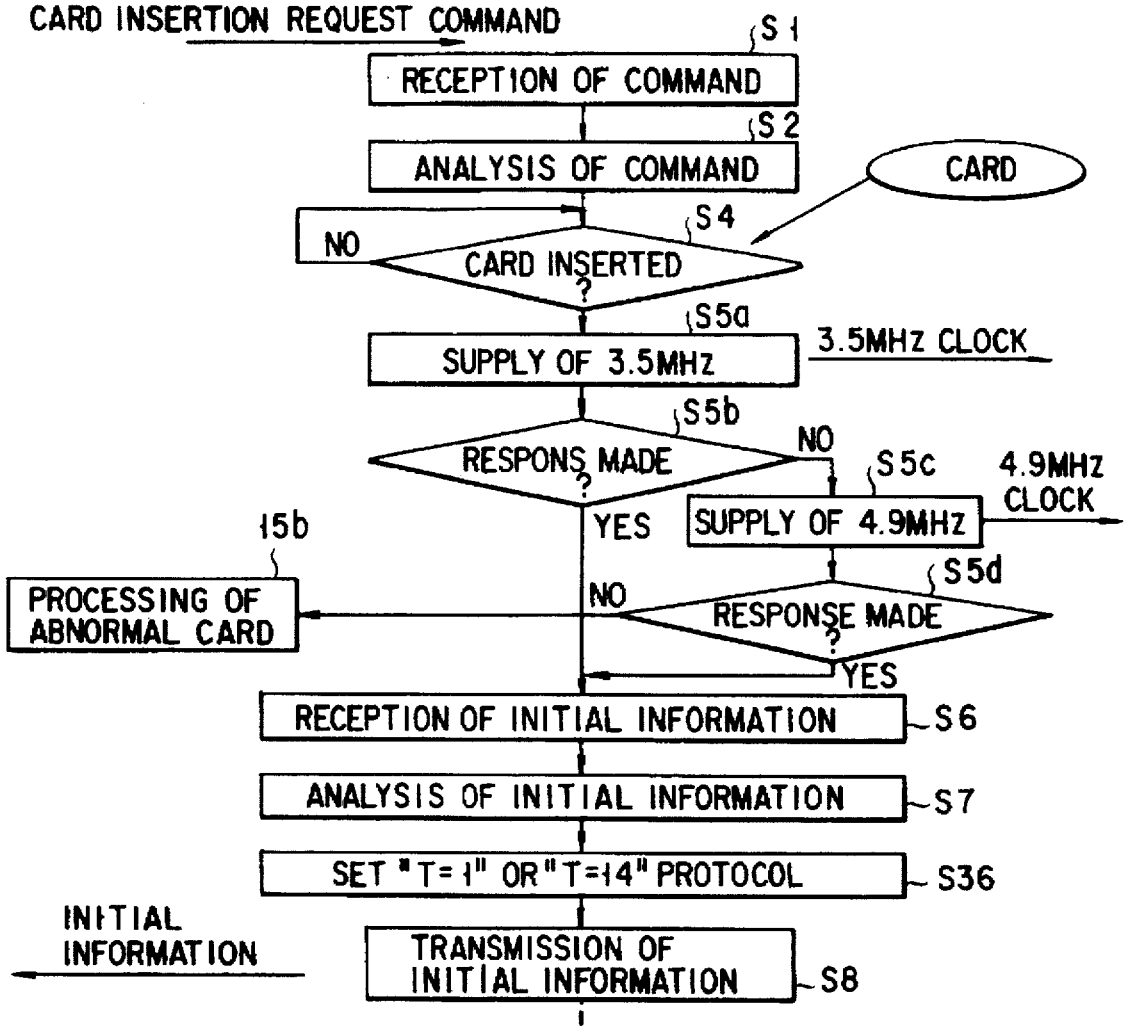
FIG. 5 is a flowchart for illustrating the whole operation in the application mode of FIG. 3 according to the second embodiment.

FIG. 5 is a flowchart for illustrating the whole operation process, and if a card insertion request command is received from a host device 20 to the reader/writer 1 in the step S1, the reader/writer 1 analyzes the command (step S2) and is set into the waiting state for insertion of an IC card.

Next, if insertion of an IC card into the insertion slot 2 is detected by a sensor disposed in the card insertion slot 2 of the reader/writer 1 (step S4), a power supply voltage and clock are supplied from a communication interface 14 to the IC card via a communication port 5 and resetting of the IC card (activation of the card) is effected (steps S5a to S5d). At this time, the clock to be supplied is different depending on the protocol as described before, and in this example, a clock of 3.5 MHz is first supplied and the reader/writer waits for initial information from the IC card.

In a case where the protocol of the IC card inserted into the insertion slot 2 is the "T=14" protocol, the IC card transmits initial information to the reader/writer 1 when it is supplied with a clock of 3.5 MHz (step S6). However, if the protocol of the IC card inserted into the insertion slot 2 is the "T=14" protocol, the IC card does not transmit initial information even when it is supplied with a clock of 3.5 MHz. This is because the IC card is not correctly operated by the clock of 3.5 MHz in a case where the protocol of the inserted IC card is the "T=14" protocol. Therefore, the reader/writer 1 determines that the protocol of the inserted IC card is not the "T=1" protocol but may be the "T=14" protocol if no response is supplied from the IC card when a preset time has elapsed after the IC card was activated, then supplies a clock of 4.9 MHz and activates the IC card (step S5c). When the IC card of "T=14" protocol is supplied with a clock of 4.9 MHz, it transmits initial information to the reader/writer. In this example, the explanation is made on the assumption that the protocol of the IC card inserted into the insertion slot 2 is the "T=1" protocol.

The IC card transmits initial information to the reader/writer 1 when it is supplied with a clock of 3.5 MHz (step S6). The reader/writer 1 analyzes the content of the received initial information (step S7) and determines, for example, that the protocol of the IC card corresponds to the "T=1" protocol based on data contained in the initial information and used for determining the protocol of the IC card, and then the reader/writer 1 is operated according to the "T=1" protocol (step S3b). Further, the reader/writer 1 transmits the initial information from the IC card to the host device 20 (step S8). In this case, if the IC card is an IC card which has a different protocol but can be operated at the same clock rate, the different protocol may be set in the step S3b since different initial information is received in the step S6.

Thus, since the protocol of the reader/writer set in the step S3b depends on the inserted IC card, it is kept unchanged until the IC card is discharged. Further, it is not necessary to change the protocol.

When a card discharging request command is supplied from the host device 20 and the reader/writer 1 is requested to discharge the IC card (step S20), the reader/writer 1 analyzes the command (step S21), interrupts the supply of power supply voltage and clock, and effects the "card non-activation" process (step S22). If the IC card is correctly discharged from the insertion slot 2 (step S23), the reader/writer 1 sets the protocol to the initial value, for example, "T=1" protocol (step S24). Further, the reader/writer 1 transmits status information of the reader/writer 1 to the host device 20 (step S25).

Thus, according to the second embodiment, since the reader/writer 1 determines the protocol of the IC card based on the initial information transmitted from the IC card inserted into the reader/writer 1 and sets the thus determined protocol, the reader/writer 1 can cope with IC cards of different protocols. In the second embodiment, a command transmitted from the host device 20 to the reader/writer 1 is not changed for each protocol. Therefore, the amount of process effected by the host device 20 can be reduced.

Next, the third embodiment is explained. The third embodiment has a feature that a reader/writer 1 selects the operation clock rate of an IC card according to data (command) transmitted from a host device 20 in a case where an IC card itself can cope with a plurality of operation clock rates in the application mode shown in FIG. 3.

In this case, the operation clock rate of the IC card specifies the rate of a clock supplied from the reader/writer 1. For example, in the case of an IC card of "T=1" protocol, the IC card may be an IC card (A type) which is operated by a clock of 3.5 MHz at the time of transmission of initial information to the reader/writer 1 and at the time of transmission/reception of data with respect to the reader/writer 1 effected after transmission of the initial information, an IC card (B type) which is operated by a clock of 3.5 MHz at the time of transmission of initial information to the reader/writer 1 and operated by a clock of 4.9 MHz at the time of transmission/reception of data with respect to the reader/writer 1 effected after transmission of the initial information, or an IC card (C type) which has the features of both of the A type and B type and can be set to one of the A type and B type by a reset signal supplied from the reader/writer 1.

Figure 6:
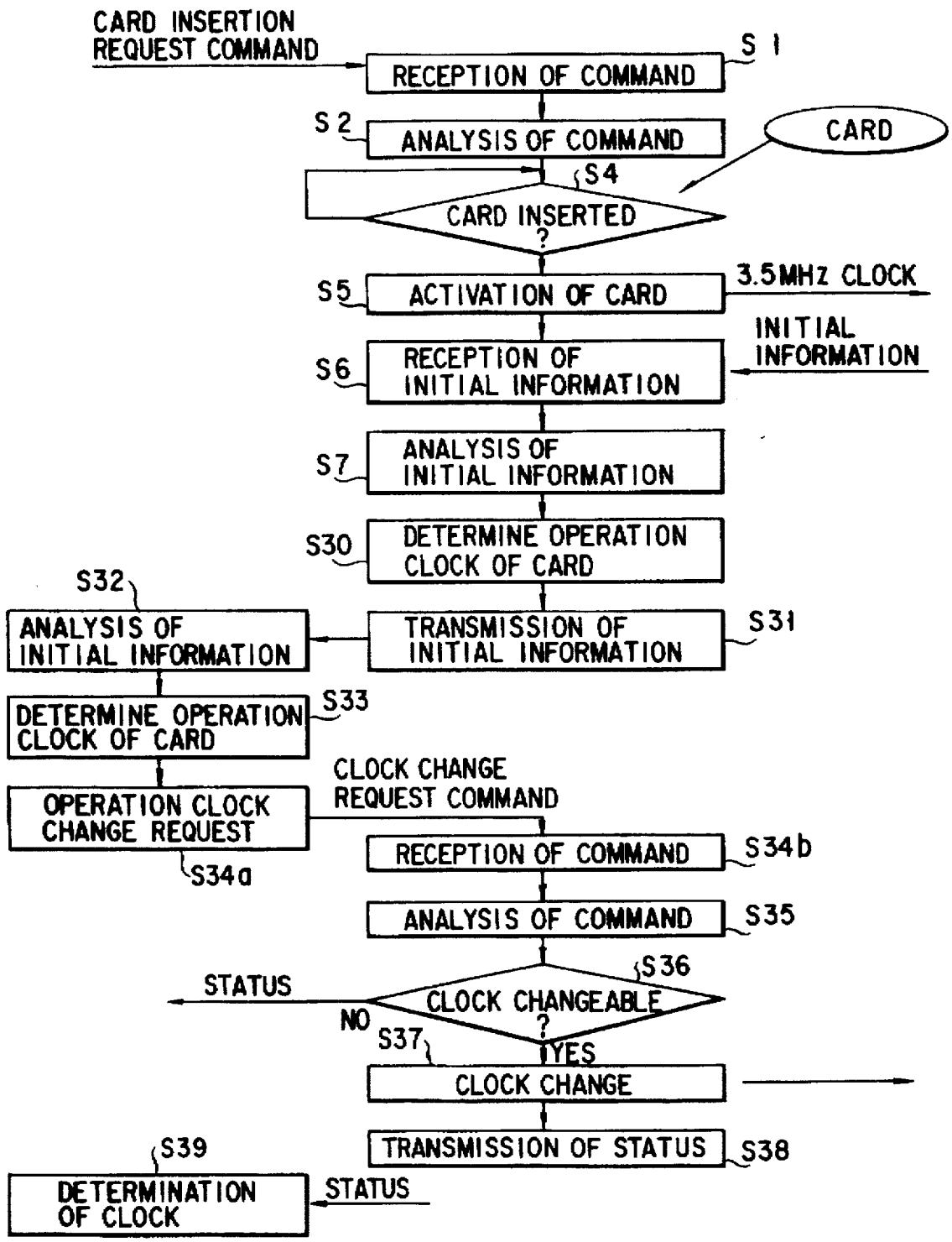
FIG. 6 is a flowchart for illustrating the whole operation in the application mode of FIG. 3 according to the third embodiment.

The operation of the reader/writer 1 according to the third embodiment of this invention for dealing with the above IC card is explained with reference to FIG. 6. First, a card insertion request command is transmitted from the host device 20 to the reader/writer 1 in the step S1. The reader/writer 1 analyzes the command (step S2) and is set into the waiting state for insertion of an IC card.

If insertion of an IC card into the insertion slot 2 is detected by a sensor disposed in the card insertion slot 2 of the reader/writer 1 (step S4), a power supply voltage and clock are supplied from the communication interface 14 to the IC card via the communication port 5 and resetting of the IC card (activation of the card) is effected (step S5). At this time, a clock of 3.5 MHz is supplied. If the IC card for the "T=1" protocol is supplied with a clock of 3.5 MHz, it transmits initial information to the reader/writer 1 (step S6).

The reader/writer 1 analyzes the received initial information and determines the operation clock rate of the IC card based on, for example, data which is contained in the initial information and permits the operation clock rate to be determined (step S30). After this, the initial information from the IC card is transmitted to the host device 20 (step S31).

The host device 20 analyzes the received initial information (step S32) and determines the operation clock rate of the IC card based on the content of data contained therein (step S33). When it is determined that it is necessary to change the operation clock rate, it supplies a clock rate change request command to the reader/writer 1 (step S34).

The reader/writer 1 analyzes the received command and determines whether the IC card is an IC card which can be operated at a higher operation clock rate based on the result of analysis of the initial information in the step S7 (step S36). If the IC card is a changeable type, the clock signal is changed (step S37). If the IC card is an IC card whose clock rate cannot be changed, this is informed to the host device 20 as status information. In this case, since the operation clock rate of the IC card is already determined in the reader/writer 1 in the step S30, the adequacy of the operation clock rate from the host device 20 is checked in the step S36.

When the clock rate is changed in the step S37, the status is supplied to the host device 20 (step S38). When the host device 20 receives the status, it analyzes the status and determines the clock which the reader/writer 1 supplies (step S39).

Thus, according to the third embodiment, the operation clock rate supplied from the reader/writer 1 to an IC card to which a plurality of operation clock rates can be applied is selected by the host device 20. The reader/writer 1 determines the operation clock rate based on initial information transmitted from an IC card inserted into the reader/writer 1. Further, in the host device 20, the operation clock rate of the IC card is determined based on the initial information from the IC card, and after it is determined that the operation clock rate must be changed, change of the clock rate is confirmed again by the reader/writer 1 and then the operation clock rate is changed. As a result, it becomes possible to easily and stably deal with an IC card to which a plurality of operation clock rates can be applied and efficiently use the IC card.

Next, the fourth embodiment is explained with reference to FIG. 7. As in the third embodiment, the fourth embodiment has a feature that a reader/writer 1 selects the operation clock rate based on initial information from an IC card in a case where an IC card itself has a plurality of operation clock rates in the application mode shown in FIG. 3. Therefore, an IC card used in the fourth embodiment is designed such that the IC card used in the third embodiment can be used as the IC card.

Figure 7:
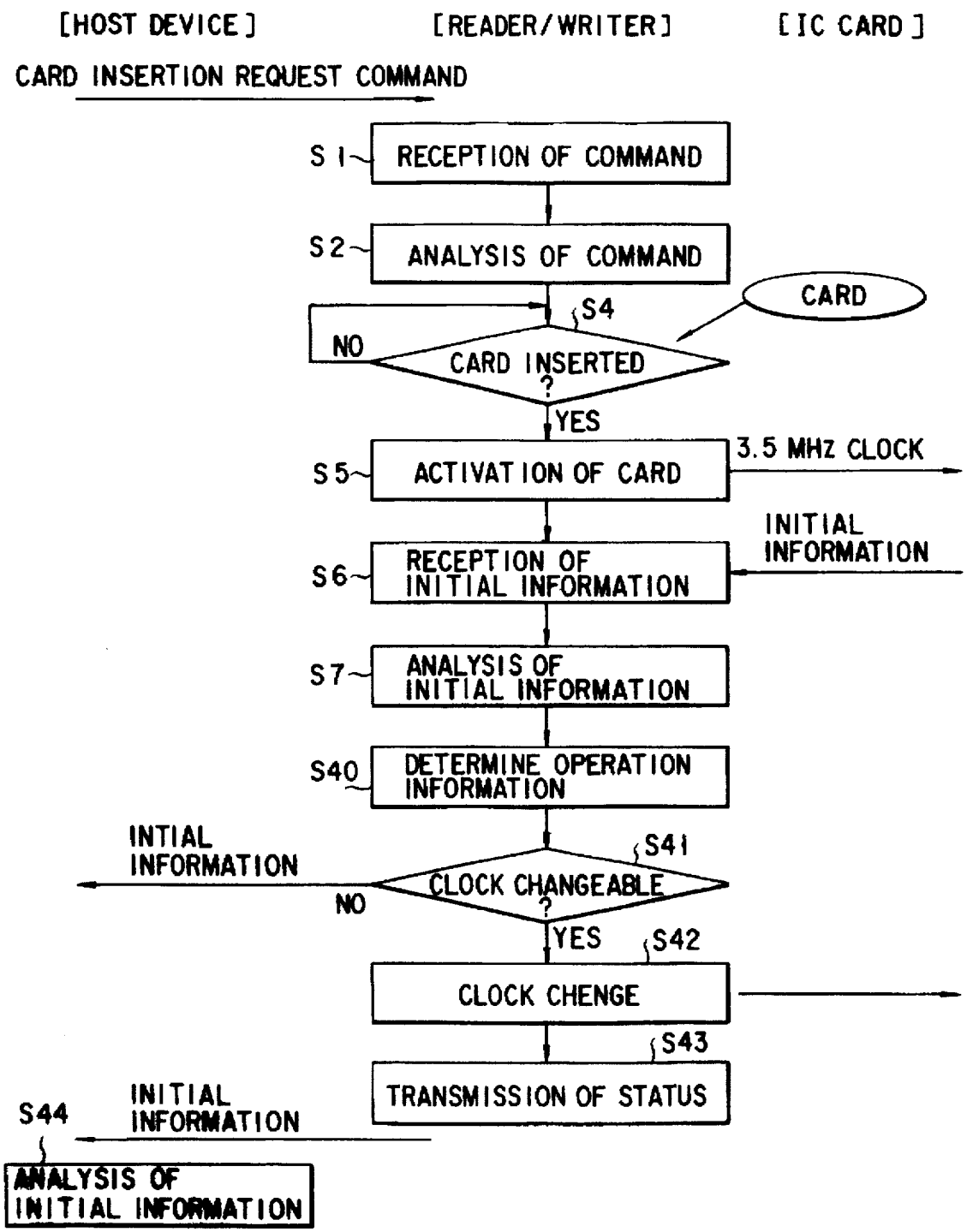
FIG. 7 is a flowchart for illustrating the whole operation in the application mode of FIG. 3 according to the fourth embodiment.

FIG. 7 is a flowchart for illustrating the whole operation process, and a card insertion request command is supplied from a host device 20 to a reader/writer 1 in the step S1. The reader/writer 1 analyzes the command (step S2) and is set into the waiting state for insertion of the IC card.

If insertion of an IC card into the insertion slot 2 is detected by a sensor disposed in the card insertion slot 2 of the reader/writer 1 (step S4), a power supply voltage and clock are supplied from the communication interface 14 to the IC card via the communication port 5 and resetting of the IC card (activation of the card) is effected (step S5). At this time, a clock of 3.5 MHz is supplied. If the IC card for the "T=1" protocol is supplied with a clock of 3.5 MHz, it transmits initial information to the reader/writer 1 (step S6).

The reader/writer 1 analyzes the content of the received initial information and, for example, determines the operation clock rate of the IC card based on data contained in the initial information and used for determining the operation clock rate (step S40). When the reader/writer 1 determines that the operation clock rate can be changed to a higher clock rate (step S41), it changes the operation clock rate and supplies 4.9 MHz clock (step S42). If the reader/writer 1 determines that the operation clock rate cannot be changed, this is informed to the host device 20 as status information together with the initial information.

After the reader/writer 1 has changed the operation clock rate in the step S42, it received initial information of the IC card and transmits the initial information to the host device 20 (step S43). The host device 20 receives and analyzes the initial information (step S44).

As described above, in the fourth embodiment, since the operation of controlling change of the clock to be supplied to the IC card is effected based on determination of the reader/writer 1, the host device 20 is not required to control the clock rate to be supplied to the IC card and the amount of process effected in the host device 20 is reduced.

Figure 8:
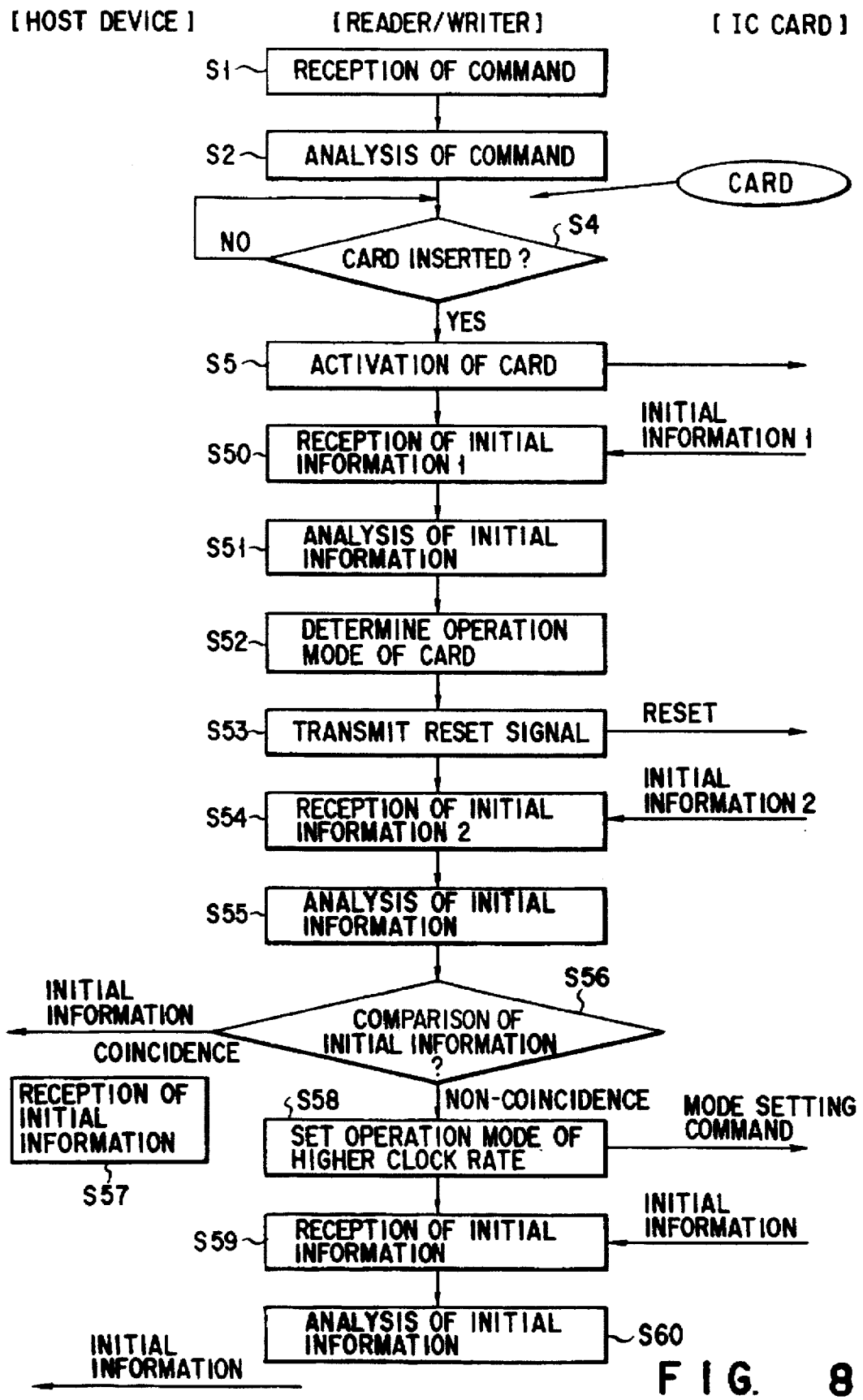
FIG. 8 is a flowchart for illustrating the whole operation in the application mode of FIG. 3 according to the fifth embodiment.

Next, the fifth embodiment is explained with reference to FIG. 8. As in the fourth embodiment, the fifth embodiment has a feature that a reader/writer 1 selects the operation clock rate of an IC card in a case where the IC card has a plurality of operation clock rates in the application mode shown in FIG. 3. However, the fifth embodiment is different from the fourth embodiment in that, after reception of the initial information from the IC card, the reader/writer supplies only a reset signal to the IC card and receives initial information again, compares the two received initial information items and then selects the operation mode of the IC card based on the result of comparison.

The operation mode of the IC card is explained below. IC cards of "T=1" protocol are divided into three types of A, B and C as described before, but in the fifth embodiment, an IC card of C type which has both of the operation modes of the A and B types and can be selectively set into one of the modes by a reset signal from the reader/writer 1 is used, for example.

In the case of C type, the IC card has a mode in which it is operated by the operation clock of 3.5 MHz and a mode in which it is operated by the operation clock of 4.9 MHz, and the IC card is operated in one of the two modes when a reset signal is supplied from the reader/writer 1, for example, and the content of the initial information is different depending on the operation mode. That is, when the IC card is operated by the operation clock of 3.5 MHz, initial information which is the same as that transmitted in the case of A type is transmitted. Therefore, the reader/writer 1 cannot determine whether the IC card is of A type or C type only based on the first initial information. However, since the operation mode of the IC card of C type is changed in response to a reset signal supplied from the reader/writer 1, the reader/writer 1 can determine the type of the IC card. Thus, in the fifth embodiment, the type of the IC card can be determined.

First, a card insertion request command is supplied from the host device 20 to the reader/writer 1 in the step S1. The reader/writer 1 analyzes the command (step S2) and is set into the waiting state for insertion of an IC card.

If insertion of an IC card into the insertion slot 2 is detected by a sensor disposed in the card insertion slot 2 of the reader/writer 1 (step S4), a power supply voltage and clock are supplied from the communication interface 14 to the IC card via the communication port 5 and resetting of the IC card (activation of the card) is effected (step S5). At this time, a clock of 3.5 MHz is supplied. If the IC card for the "T=1" protocol is supplied with a clock of 3.5 MHz, it transmits initial information to the reader/writer 1 (step S50).

The reader/writer 1 analyzes the content of the received initial information (step S51) and, for example, determines the operation mode of the IC card based on data which is contained in the initial information and permits the operation clock rate to be determined (step S52). As described before, since the operation mode of the IC card of C type is changed in response to a reset signal, the reader/writer 1 supplies a reset signal to the IC card again (step S53). In response to the reset signal, the IC card transmits initial information to the reader/writer 1 again (step S54).

The reader/writer 1 analyzes the content of the second received initial information (step S55) and compares it with the content of the first received initial information (step S56). When data of the first received initial information coincides with data of the second received initial information, it is determined that the operation mode is fixed, that is, the IC card is an IC card of A type, for example, and the second received initial information is transmitted to the host device 20 (step S57). On the other hand, if the two initial information items do not coincide with each other, the operation mode of the IC card is set to an operation mode in which a higher one of the operation clock rates is used (step S58).

After this, if initial information corresponding to the operation mode set in the step S58 is transmitted from the IC card (step S59), the reader/writer 1 analyzes the content of the received initial information (step S60) and supplies the same to the host device 20 (step S61).

Thus, according to the fifth embodiment, in a case where the IC card has a plurality of operation modes, the reader/writer 1 supplies a reset signal to the IC card twice to select the operation mode of the IC card. That is, initial information received from the IC card at the time of first supply of the reset signal is compared with initial information received from the IC card at the time of second supply of the reset signal. If the contents of the two initial information items do not coincide with each other, the reader/writer 1 determines that the IC card is an IC card of C type operated in a plurality of operation modes. By setting the operation mode of a higher clock rate, the reader/writer 1 can adequately deal with the IC card having a plurality of operation modes, thereby making it possible to efficiently use the IC card.

Figure 9:
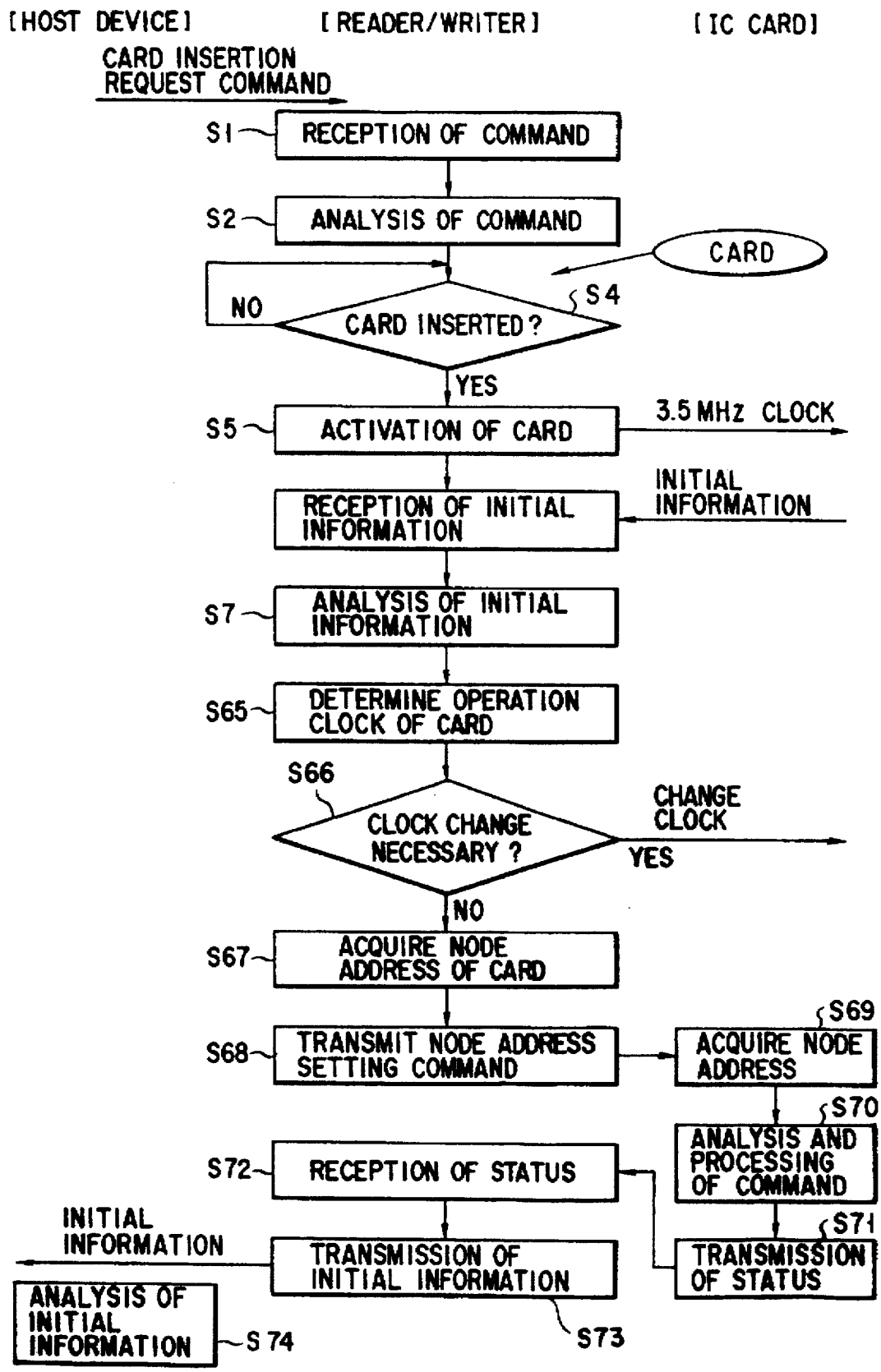
FIG. 9 is a flowchart for illustrating the whole operation in the application mode of FIG. 3 according to the sixth embodiment.

Next, the sixth embodiment is explained with reference to FIG. 9. In the sixth embodiment, a reader/writer 1 sets a node address of an IC card after receiving initial information from the IC card in the application mode shown in FIG. 3. As a result, the IC card node address is attached to each command for the IC card from a host device 20, and when the reader/writer 1 receives a command from the host device, it directly supplies the same to the reader/writer without analyzing the command. Therefore, it becomes possible to prevent the IC card command from being erroneously executed by the reader/writer 1.

First, a card insertion request command is supplied from the host device 20 to the reader/writer 1 in the step S1. The reader/writer 1 analyzes the command (step S2) and is set into the waiting state for insertion of an IC card.

If insertion of an IC card into the insertion slot 2 is detected by a sensor disposed in the card insertion slot 2 of the reader/writer 1 (step S4), a power supply voltage and clock are supplied from a communication interface 14 to the IC card via a communication port 5 and resetting of the IC card (activation of the card) is effected (step 5). When activated, the IC card transmits initial information to the reader/writer 1 (step S6). The reader/writer 1 analyzes the content of the received initial information (step S7) and determines the operation clock rate of the IC card (step S65). Whether or not the operation clock must be changed is determined based on initial information, and if it is necessary to change the operation clock rate, the clock to be supplied to the IC card is changed (step S66).

Next, the reader/writer 1 determines whether a node address of the IC card previously specified by the host device 20 is present or not, and if the node address is present, it acquires the specified node address. If it is not specified, the reader/writer 1 acquires a fixed IC card node address (step S67). By using the acquired node address, the reader/writer 1 supplies a command for setting the node address to the IC card (step S68).

After transmitting initial information, the IC card treats the node address attached to the first received command as a node address thereof. Therefore, the node address of the IC card can be set by supplying the command to the IC card.

When the IC card receives the command from the reader/writer 1, it acquires the node address (step S69), analyzes and processes the command (step S70), and transmits status information of the IC card as the result of analysis and processing to the reader/writer 1 (step S71).

When receiving the status (step S72), the reader/writer 1 transmits the initial information from the IC card to the host device 20 (step S73). The host device 20 receives and analyzes the initial information (step S74). The node address of the IC card is determined at this time, and after this, the host device 20 communicates with the IC card by use of the determined node address.

In the above explanation, setting of the node address of the IC card is effected by use of the command supplied from the reader/writer 1, but it is not limitative and, for example, it is possible to supply a command for setting the node address of an IC card from the host device 20. That is, setting of the node address of the IC card can be effected with the same result as described above by causing the reader/writer 1 to transmit the initial information to the host device 20 after analysis of the initial information in the step S7 and causing the host device 20 which has received the initial information to supply a command used for setting a node address of the IC card to the IC card.

Thus, according to the sixth embodiment, it becomes possible to easily and stably set a desired node address into the IC card, and therefore, communication between the IC card, reader/writer 1 and host device 20 can be stably effected by use of the set node address and the communication processing time can be shortened.

As described above, according to this invention, an IC card reader/writer can be provided which can deal with an IC card of a plurality of protocols, cope with the function inherent to each protocol and significantly increase the convenience thereof.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An IC card reader/writer comprising:

receiving means for receiving a command from a host device, said command containing protocol information corresponding to a particular one of various protocols that differ from each other;

analyzing means for analyzing the command received by said receiving means;

setting means for setting a protocol for communication with an IC card in accordance with the protocol information contained in the command analyzed by said analyzing means; and communication means for communicating with said IC card based on the protocol set by said setting means.

2. The IC card reader/writer according to claim 1, wherein said communication means includes:

second receiving means for receiving initial information from said IC card, said initial information containing protocol information inherent to said IC card;

second analyzing means for analyzing the protocol inherent to said IC card based on the initial information received by said second receiving means;

comparing means for comparing the protocol inherent to said IC card and analyzed by said second analyzing means with the protocol set by said setting means; and transmission means for transmitting the initial information to the host device when the protocol inherent to said IC card coincides with the protocol set by said setting means.

3. An IC card reader comprising:

activating means for activating an IC card by use of a clock having a first frequency;

first receiving means for receiving initial information containing protocol information of said IC card and transmitted from said IC card when said activating means activates said IC card;

clock signal supplying means for supplying a clock signal having a second frequency to said IC card;

second receiving means for receiving initial information containing the protocol information of said IC card and transmitted from said IC card in response to the clock signal; and protocol determining means for determining a protocol for succeeding communication with said IC card from the protocol of said IC card contained in the initial information received by said first receiving means or the second receiving means.

4. The IC card reader according to claim 3, wherein said clock supplying means supplies the clock signal said IC card when said first receiving means fails to receive the initial information.

5. The IC card reader according to claim 3, further comprising third receiving means for receiving a clock-frequency changing command from a host device, and in which said clock supplying means supplies the clock signal to said IC card when said third receiving means receives the clock-frequency changing command.

6. An IC card reader according to claim 5, further comprising means for setting a node address of the IC card after said first and second receiving means have received initial information.

7. An IC card reader according to claim 5, further comprising setting means for setting a node address of the IC card based on a node address of the IC card previously specified by the host device after said first and second receiving means have received initial information.

8. An IC card reader comprising:

activating means for activating an IC card by use of a first protocol;

first receiving means for receiving initial information containing protocol information of said IC card and transmitted from said IC card when said activating means activates said IC card;

determining means for determining from the initial information received by said first receiving means whether it is possible to change a communication protocol;

protocol changing means for changing the first protocol to a second protocol when said determining means determines that it is possible to change the communication protocol; and transmitting means for transmitting status information to a host device when said determining means determines that it is impossible to change the communication protocol, said status information indicating that it is impossible to change the communication protocol.

9. The IC card reader according to claim 8, wherein said first protocol is activated by a 3.5 MHz clock, and said activating means has means for supplying the 3.5 MHz clock to said IC card.

10. The IC card reader according to claim 9, wherein said second protocol is activated by a 4.9 MHz clock, and said protocol changing means has means for supplying the 4.9 MHz clock to said IC card.

11. An IC card reader comprising:

activating means for activating an IC card by use of a first protocol;

first receiving means for receiving initial information containing protocol information of said IC card and transmitted from said IC card when said activating means activates said IC card;

reset means for resetting said IC card by use of a second protocol;

second receiving means for receiving initial information containing protocol information of said IC card and transmitted from said IC card when said reset means resets said IC card;

comparing means for comparing the protocol information contained in said initial information received by said first receiving means with the protocol information contained in the initial information received by said second receiving means; and determining means for determining a protocol for succeeding communication with said IC card from results of comparison performed by said comparing means.

12. The IC card reader according to claim 11, wherein said first protocol is activated by a 3.5 MHz clock, said activating means has means for supplying the 3.5 MHz clock to said IC card, said second protocol is activated by a 4.9 MHz clock, and said reset means has means for supplying the 4.9 MHz clock to said IC card.

13. The IC card reader according to claim 11, wherein when the protocol information contained in the initial information received by said first receiving means coincides with the protocol information contained in the initial information received by said second receiving means, said determining means determines that the protocol for succeeding communication with said IC card is a coincident protocol, and when the protocol information contained in the initial information received by said first receiving means is different from the protocol information contained in the initial information received by said second receiving means, said determining means determines the protocol for succeeding communication with said IC card is a protocol of higher communication rate.

* * * * *